United States Patent [19]

Bender et al.

[11] Patent Number: 5,387,858
[45] Date of Patent: Feb. 7, 1995

[54] ENERGY-CONSERVING MULTIPLE POWER SOURCE AND METHOD FOR BATTERY-OPERATED PRODUCTS

[75] Inventors: Edward D. Bender, Warner; W. David Stratton, Canaan, both of N.H.

[73] Assignee: Academy of Applied Science, Concord, N.H. ; a part interest

[21] Appl. No.: 89,627

[22] Filed: Jul. 12, 1993

Related U.S. Application Data

[63] Continuation of Ser. No. 842,457, Feb. 27, 1992, abandoned.

[51] Int. Cl.$^6$ .............................................. H02J 7/00
[52] U.S. Cl. ........................................... 320/61; 320/15
[58] Field of Search ..................... 307/66; 320/61, 15

[56]  References Cited

U.S. PATENT DOCUMENTS

| | | | |
|---|---|---|---|
| D. 256,360 | 8/1980 | Nishimoto et al. | D14/70 |
| 2,919,353 | 12/1959 | Paradise | 250/239 |
| 2,951,163 | 8/1960 | Shaffer et al. | 250/212 |
| 3,631,257 | 12/1971 | Behr et al. | 307/66 |
| 3,921,049 | 10/1975 | Mellors et al. | 320/2 |
| 4,044,268 | 8/1977 | Hammel et al. | 307/66 |
| 4,122,396 | 10/1978 | Grazier et al. | 325/492 |
| 4,209,346 | 6/1980 | King | 136/89 |
| 4,323,788 | 4/1982 | Smith | 307/66 |
| 4,434,509 | 2/1984 | Schrepel | 455/343 |
| 4,667,142 | 5/1987 | Butler | 320/6 |
| 4,963,811 | 10/1990 | Weber | 320/1 |
| 5,177,371 | 1/1993 | Faulk | 307/66 |

*Primary Examiner*—Steven L. Stephan
*Assistant Examiner*—Robert Nappi
*Attorney, Agent, or Firm*—Rines & Rines

[57] ABSTRACT

An energy-conserving photvoltaic- or solar-rechargeable power source for commercial or industrial battery-operated products is provided, enabling a high degree of reliability of continued operation through a method involving the use of a backup battery or other backup d.c. voltage source which is automatically and instantaneously selected when the rechargeable cell falls below a predetermined lower threshold voltage. As the rechargeable cell receives charge from the solar cell, the circuit automatically switches back to it as the primary power source when an upper threshold voltage is reached. Moreover, the initial connecting of the rechargeable cell to power the product is ensured upon the turn-on of the product, even if not fully charged (though above the lower threshold voltage), conserving the backup source. More general applications are also disclosed.

15 Claims, 3 Drawing Sheets

ENERGY-CONSERVING MULTIPLE POWER SOURCE AND METHOD FOR BATTERY-OPERATED PRODUCTS

This is a File Wrapper Continuation application of Ser. No. 842,457, filed Feb. 27, 1992 now abandoned.

The present invention relates to multiple power source circuits and methods for battery-operated products, such as AM/FM radios, radio/cassette players, stereo headsets, tape players and recorders, portable compact disc players and similar consumer and industrial electronic and electrical products; being directed to such products that are battery operated and, more particularly, to the use of photovoltaic (solar) cells, sometimes referred to as panels, in conjunction with a combination of rechargeable batteries and non-rechargeable emergency back-up batteries useful over a substantial portion of, if not the total life of the product.

BACKGROUND

The art is replete with systems for enabling the portable battery powering of consumer and other products of the above-mentioned types, using non-rechargeable replaceable batteries such as so-called alkaline cells and/or rechargeable cells such as nickel-cadmium (NICAD) cells and the like.

It has earlier been proposed, as an illustration, to keep rechargeable batteries charged from the mains power outlet plugs as in U.S. Pat. No. 4,434,509. There are also proposals extending over several decades for using solar cells either directly or in combination with rechargeable batteries, as described, for example in U.S. Pat. Nos. 2,919,353; 2,951,163; 4,122,396; D256,360; and 4,209,346. It has further been proposed to power a radio with the combination of a solar cell, a rechargeable battery and a non-rechargeable battery with means for switching therebetween, as in U.S. Pat. No. 4,667,142; and various ether circuits have been proposed for solar-battery systems including U.S. Pat. No. 3,921,049 for using blocking diodes to prevent the discharge of a battery through a solar cell, and the like.

It is rather significant that, to date, the widespread use of solar cells in such portable battery-operated products has not been achieved, despite the potentially free use of the sun and lighting in home, office and other institutional and public facilities. It is believed that, among the reasons for such lack of general adoption, are the inefficient use of costly solar cells and the lack of adequate energy conservation in the power circuits.

Underlying the present invention, however, is the discovery, of a novel multiple power source system involving solar cells for battery-operated commercial and/or industrial products that can provide for a remarkable degree of energy conservation and, indeed, the insurance of a useful life that can in many cases extend substantially for the life of the product itself or a substantial portion thereof.

OBJECTS OF INVENTION

It is accordingly a principal object of the invention to provide a new and improved energy-conserving multiple power source and method for battery-operated products, that obviates the above-mentioned and other limitations of prior art solar cell powering circuits and the like.

A further object is to provide a novel solar cell (panel)-rechargeable cell primary power source in combination with an automatically operable and inherently trivially used non-rechargeable back-up battery power source of consequently long life.

Other and further objects will be explained hereinafter and are more particularly delineated in the appended claims.

SUMMARY

In summary, thus, from one of its major viewpoints, the invention embraces a method of conserving energy in a multiple power source for powering electrical and electronic products and in which a rechargeable primary d.c. photovoltaic cell-controlled source and a back-up d.c. voltage source are provided, that comprises, developing primary d.c. voltage from the photovoltaic cell-controlled source in response to charging induced by light received thereby; establishing upper and lower threshold voltage values for such primary d.c. voltage; continuously sensing said primary d.c. voltage to monitor its value; and automatically and instantaneously responding to said sensing and connecting the back-up d.c. voltage source to the product while disconnecting the primary d.c. voltage source therefrom when the voltage value thereof drops to said lower threshold voltage; and automatically and instantaneously reconnecting the primary d.c. voltage source to the product while disconnecting the back-up d.c. voltage source therefrom when the voltage value of the primary d.c. voltage source has recharged sufficiently to reach said upper threshold value.

The present invention admirably meets the need for an energy-conserving photovoltaic-rechargeable power source for commercial or industrial battery-operated products, providing a high degree of reliability of continued operation through the method involving use of the back-up battery, or other back-up d.c. voltage source, which is automatically and instantaneously selected when the rechargeable cell falls below a lower threshold voltage. As the rechargeable cell receives charge from the solar cell, the circuit switches back to it as the primary power source when an upper threshold voltage is reached.

Preferred and best mode designs and features are later presented.

DRAWINGS

The invention will now be described in connection with the accompanying drawings, FIG. 1 of which is a block diagram illustrating the principles underlying the invention; and FIG. 2 is a schematic circuit diagram of a preferred circuit design.

DESCRIPTION OF PREFERRED EMBODIMENT

Figure 1:
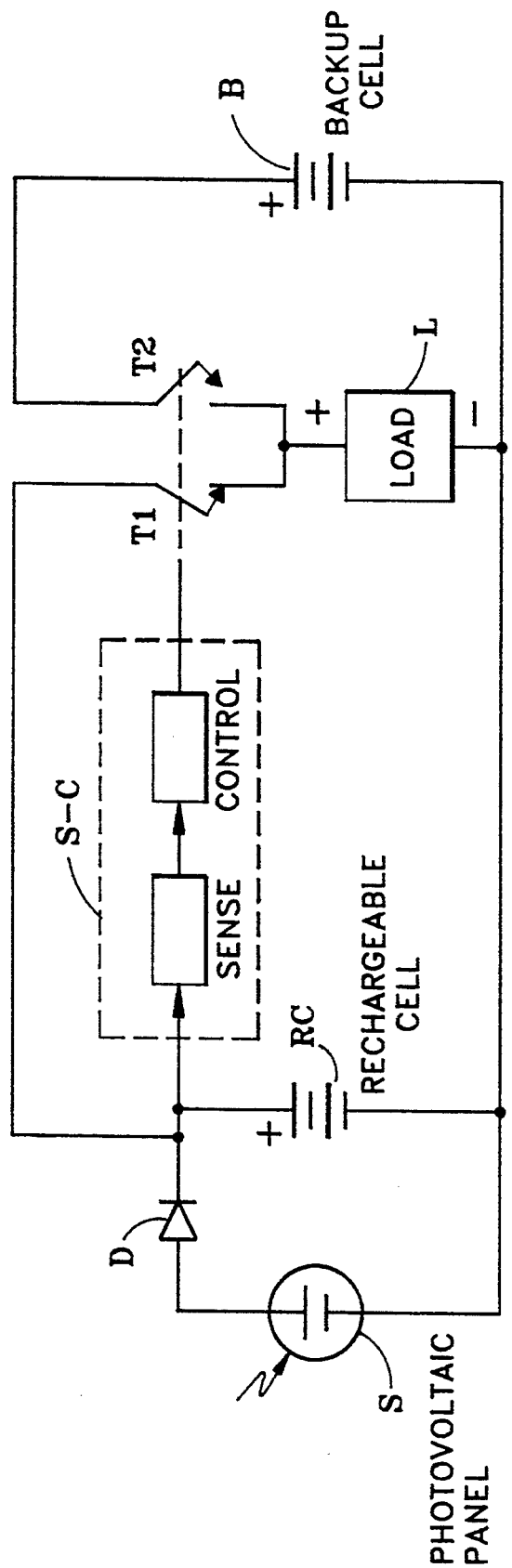

Referring first to FIG. 1, a rechargeable cell(s) is shown at RC, such as of the before-mentioned NICAD type, connected through a diode D to a photovoltaic cell(s) or panel S responsive to sunlight or artificial light, serving to tend to keep the cell RC in a charged condition at or approaching an upper threshold voltage $V_u$, later more fully described. A semiconductor switch, schematically represented at $T_1$, connects, when closed, the rechargeable cell RC to the load-to-be-powered L, such as one of the products above-described or the like. This is effected provided that sense and control circuits S-C, monitoring the state of the rechargeable cell voltage, indicate either that the cell RC is charged to said upper threshold value $V_u$ or that it has dropped below a lower threshold voltage $V_L$. In the latter event, a similar semiconductor switch $T_2$ closes as $T_1$ opens, connecting a non-rechargeable battery cell(s) B (or other suitable back-up d.c. voltage source) through closed switch $T_2$ to provide back-up power to the load L during the period that the voltage in the rechargeable cell remains below the upper threshold value $V_u$, again as more fully hereinafter explained.

Thus, when the voltage of the primary rechargeable cell/photovoltaic panel combination RC-S falls below such lower threshold voltage $V_L$, the circuit automatically switches to the back-up cell B, with such switching being instantaneous and with no interruption of powering of the load product L. As charge is supplied to the rechargeable cell RC through the solar panel S, the upper threshold voltage $V_u$ will again be reached, at which time the circuit automatically and instantaneously switches back to the rechargeable cell RC as the power source.

A novel feature of the design, not incorporated in prior art, is that whenever the circuit is turned on, provided the voltage on the rechargeable cell RC is greater than the lower threshold voltage $V_L$, the rechargeable cell RC is automatically selected as the power source—a feature permitting continued use of the NICAD cell RC (and preservation of the backup cell B), even though its charge dropped below the upper threshold voltage $V_u$ when previously turned off. The use of two separate switching thresholds ensures that the rechargeable cell RC becomes fully charged before it is reconnected to the load.

The circuit of FIG. 1 is configured such that the NICAD cell RC charges whenever sufficient light falls on the solar panel S. The backup cell B, however, receives no charge, in this embodiment.

Figure 2A:
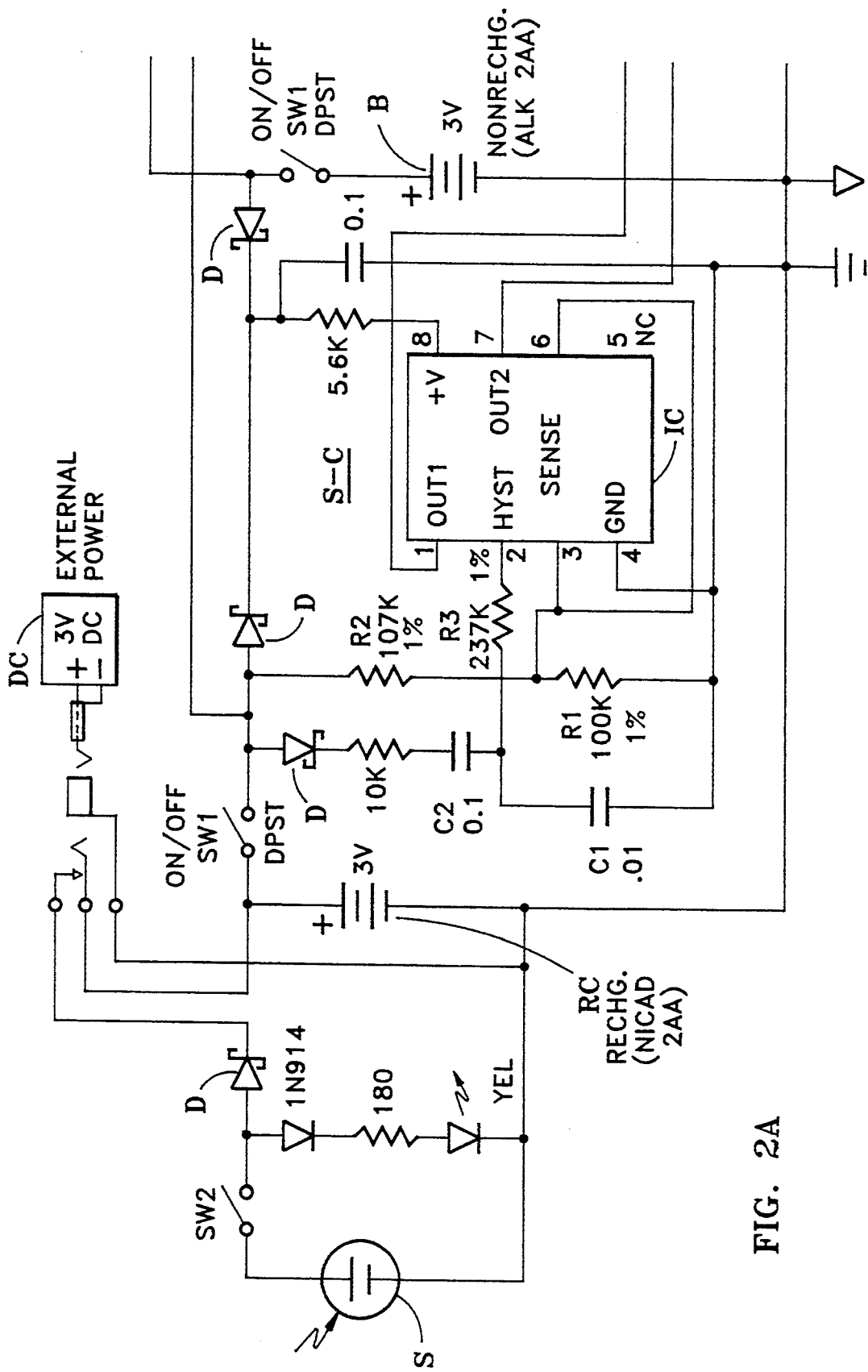
Figure 2B:
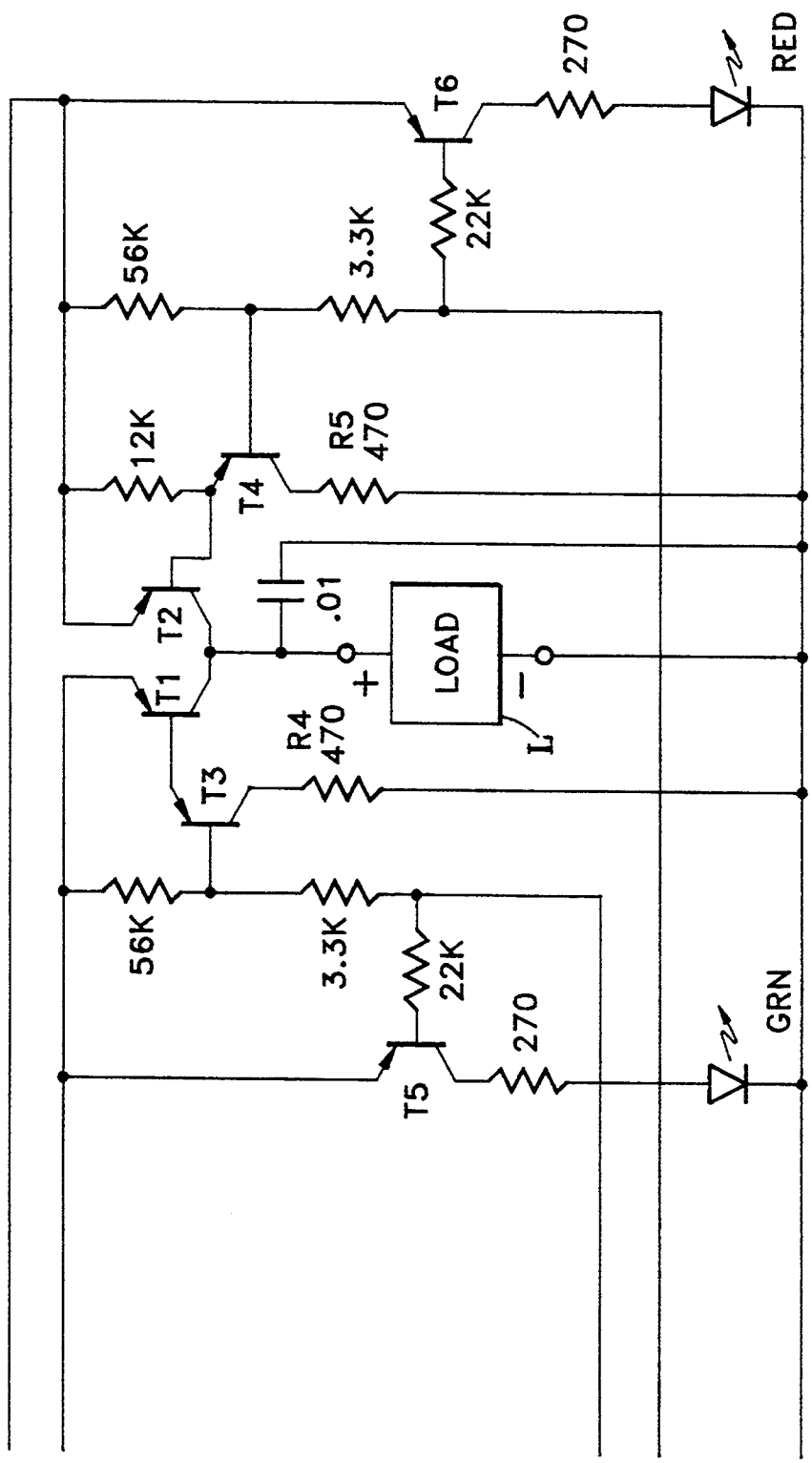

A suitable practical circuit for the system of the block diagram of FIG. 1 has been successfully designed, constructed and tested and appears in FIG. 2. In this prototype, the load L is an AM/FM stereo cassette player requiring a voltage of 2 to 3 volts and a current of up to 0.2 amperes. These values, of course, do not represent actual limits of the circuit but are only illustrative. Higher load current can be provided, for example, by reducing the value of later-described resistors in the circuit. Higher operating voltages are both feasible and attractive, in that the voltage loss across the switches $T_1$ and $T_2$ connecting the load L becomes less significant. Further, with higher operating voltages (for example, 5 volts or greater), low-drive power MOSFET's can be beneficially employed in place of bipolar switches $T_1$ and $T_2$.

In normal operation, switch 2 (SW2) is closed and the photovoltaic panel supplies charge to a rechargeable cell.

Referring to the details of FIG. 2, the basic components are provided with the same reference letters and symbols as in FIG. 1.

In normal operation, a conventional on-off solar cell switch is provided at SW2 which, when closed, enables the photovoltaic cell(s) or panel S to charge the NICAD rechargeable cell RC through the diode D in response to light received by the photovoltaic or solar cell(s). When the usual product (load) ON/OFF switch SW1 is closed, power is applied to the load L as hereinafter explained.

The before-mentioned sense and control circuitry S-C is shown embodying an integrated circuit voltage sensor and associated components IC that continuously monitors the voltage of the rechargeable cell. The value of this voltage controls the IC output lines OUT1 and OUT2 (MOS transistors), which, in turn, establish the alternately oppositely operative states of semiconductors $T_1$ and $T_2$, PNP bipolar transistors operating as switches.

The IC voltage sensor permits the use of hysteresis to establish the before-mentioned upper and lower threshold voltages $V_u$ and $V_L$ in the control of the load switches $T_1$ and $T_2$; the upper and lower switching threshold voltages being established with resistors R1, R2 and R3. When the NICAD cell RC is charged to the upper predetermined threshold voltage $V_u$ (2.7 volts, for example, in the prototype, established by $R_2$), output line OUT1 of IC is low, turning on $T_1$ through its associated transistor $T_3$. Both transistors saturate and the load L is operatively connected to the NICAD cell RC through $T_1$. The output OUT2 of IC remains high, holding $T_2$ and its associated transistor $T_4$ inoperative in cutoff, isolating or disconnecting the alkaline backup cell B from the load L.

This state is maintained until the voltage of the NICAD RC falls to the lower threshold voltage $V_L$ (approximately 2 volts, for example, in the prototype, as established by $R_3$). When this predetermined lower threshold is reached, the outputs of IC reverse state. $T_2$ and $T_4$ now saturate, operatively connecting the load L to the backup cell B. OUT1 is now high, forcing $T_1$ and $T_3$ into cutoff, and isolating or disconnecting from the NICAD cell RC. Hysteresis (the difference between the upper and lower threshold voltages $V_u$ and $V_L$) ensures that the NICAD cell RC is not switched to the load L until it is fully charged. The upper threshold voltage $V_u$ is independent of the presence of the backup cells B. The lower threshold voltage $V_L$, however, does have a slight dependence on the presence of the backup cells, increasing by approximately 0.2 volts if these cells are removed.

As the battery voltages are small (approximately 3 volts in the prototype: two series-connected AA cells), a key design specification of the circuit is low voltage drop across the load-connecting $T_1$ and $T_2$ switches. This is achieved with the before-identified low-power high-current PNP amplifier transistors employed as switches; these high-current large-geometry devices exhibiting low saturation voltages of approximately 50 millivolts at full load current (150–200 milliamperes). Resistors R4 and R5 establish the base current of switches $T_2$ and $T_2$, and control saturation voltage. Lowering the value of these resistors permits larger load current, while maintaining low switch saturation values. The trade-off in lowering these resistor values resides in the fact that they establish the saturation currents of $T_3$ and $T_4$, bias currents which do not serve to power the load.

The load L is thus powered from the rechargeable cell RC provided that the voltage thereof is above the lower threshold voltage $V_L$. When this lower trip voltage is reached, the backup cell B is instantaneously and automatically switched in. To prevent the circuit from oscillating between primary and backup cells as the primary cell charges, the before-described hysteresis operation is employed. The primary cell RC must charge to the upper threshold voltage $V_u$ before it is switched back into the circuit. There is, however, an important exception to this operation. As the rechargeable cell RC powers the load L, its voltage may drop below the upper threshold value $V_u$. If power is turned off and then turned on at a later time, the circuit will still access the rechargeable cell RC as the primary source, even though its voltage is below the upper threshold level $V_u$. This is achieved through the use of an over-compensated attenuator comprised of capacitors C1, C2 and resistors R1, R2. Under normal operation, the resistive attenuator R1–R2 establishes the upper threshold voltage $V_u$ and monitors the rechargeable cell state. When the circuit is turned on, on the other hand, the switching transient at the SENSE input of IC, established by capacitive divider C1–C2, ensures that the rechargeable cell RC will be switched to the load L. The circuit now functions with the rechargeable cell as the primary power source, saving the backup cell, until such time as its voltage falls below the lower threshold level VL.

An important feature of the invention resides in the fact that the RC cell will be accessed on turn-on even if it has not been recharged, provided that its voltage is at or above $V_L$. Without this feature, backup cell would be called on to power the load on turn-on, even though the RC cell has sufficient charge to supply the power.

Under normal operation, accordingly, with the rechargeable cells RC installed, the switch SW2 remains closed, allowing incident light continually to charge the NICAD cells independent of the status of the ON/OFF switch.

In some circumstances, it may be possible to operate, at least to some extent, with solar power alone. Should the user remove the rechargeable cells while retaining the backup cells in the circuit, for example, power will still be provided by the solar panel alone, provided it can supply the required load current. If the incident light level falls, the circuit will switch to the backup cell and operation will be maintained. Since no current now flows through the photovoltaic source resistance, the panel voltage will increase to its open-circuit value. If the drop in incident light energy is slight, this open-circuit voltage can exceed the upper threshold point, switching the circuit back to the solar panel. But, as this lowered incident light energy is insufficient to provide the required load current, yet sufficient to yield a no-load voltage exceeding the upper trip voltage, the circuit will oscillate between the panel and the backup cell. Such anomalous performance may be eliminated either by installing the rechargeable cells or by opening solar panel switch SW2.

The status of the circuit is indicated with three low-current light-emitting diodes (LED's). A yellow LED referenced at YEL monitors the photovoltaic panel S; it is lit when incident energy falls on the panel and the panel is connected to the circuit. A green LED, labelled GRN, indicates that the rechargeable cell is powering the load. When the backup cell is providing power, a red LED (RED) is it.

Components and values successfully used in the circuit of FIG. 2 are as follows: IC-ICL 7665ACPA of Maxim Inc,; diodes D—Motorola 1N5819; transistors $T_1$ and $T_2$—Motorola MPS 750; transistors $T_3$, $T_4$, $T_5$ and $T_6$—2N3906; capacitors and resistors—see values in FIG. 2.

While for reasons above-explained, the circuit of FIGS. 1 and 2 is preferred for efficiency and energy conservation as well as long life, there are variations and modifications that may be effected, though some achieving only part of and not all of the benefits of the invention. The power sources of the circuit may, for example, be configured in several ways, other than the preferred manner, as with a pair of rechargeable cells, serving as the primary power source, connected to the solar panel, and a pair of non-rechargeable cells serving as the backup source. The circuit, however, will also function with some, but certainly not the synergistic total advantages of the invention in the Following configurations: rechargeable cells only installed (backup cells omitted); backup cells only installed using solar panels alone, as above-described (primary rechargeable cells omitted); no cells installed, but only if sufficient incident light energy is supplied to the photovoltaic panel; and external DC charging supply source connected (with or without batteries installed), as shown at DC in FIG. 2. Such and further modifications will occur to those skilled in this art, and such are considered to fall within the spirit and scope of the invention as defined in the appended claims.

What is claimed is:

1. A multiple D.C. power source for electrical and electronic products having, in combination, a rechargeable primary D.C. voltage source having chargeable means and comprising photovoltaic cell means and in which the voltage value thereof is controlled in response to charging induced by light received by the photovoltaic cell means; a backup D.C. voltage source; oppositely alternately operative switching means for connecting the primary D.C. voltage source to the product while disconnecting the backup D.C. voltage source from the product; and sense and control means connected to monitor the state of the said voltage value of the primary D.C. voltage source and for establishing predetermined upper and lower threshold voltages therefor, and for controlling the switching means in response to the monitoring, automatically and instantaneously to connect the backup D.C. voltage source to the product while disconnecting the primary D.C. voltage source therefrom when said voltage value thereof drops to said lower threshold voltage; and means for automatically and instantaneously reconnecting the primary D.C. voltage source to the product while disconnecting the backup D.C. voltage source from the product when the voltage value of the primary D.C. voltage source has recharged sufficiently to reach said upper threshold value, whereby in the absence of the backup D.C. voltage source the switching means is powered from the primary D.C. voltage source.

2. A multiple D.C. power source as claimed in claim 1 and in which said primary D.C. voltage source comprises rechargeable battery cell means connected to be charged by said photovoltaic cell means.

3. A multiple D.C. power source as claimed in claim 2 and in which said backup D.C. voltage source comprises non-rechargeable battery cell means.

4. A multiple D.C. power source as claimed in claim 1 and in which said backup D.C. voltage source comprises non-rechargeable battery cell means.

5. A method of conserving energy in a multiple power source for powering electrical and electronic products and in which a primary D.C. photovoltaic cell-controlled source and a back-up D.C. voltage source are provided, that comprises, developing primary D.C. voltage from the photovoltaic cell-controlled source in response to light received thereby; establishing upper and lower threshold voltage values for such primary D.C. voltage; continuously sensing said primary D.C. voltage to monitor its value; and automatically and instantaneously responding to said sensing and connecting the back-up D.C. voltage source to the product while disconnecting the primary D.C. voltage source therefrom when the voltage value thereof drops to said lower threshold voltage, and automatically and instantaneously reconnecting the primary D.C. voltage source to the product while disconnecting the back-up D.C. voltage source from the product when the voltage value of the primary D.C. voltage source again reaches said upper threshold value, whereby in the absence of the back-up D.C. voltage source the product is powered from the primary D.C. voltage source.

6. A method as claimed in claim 5 and in which the developing of the primary D.C. voltage is effected by charging a rechargeable battery cell from a photovoltage cell.

7. A method as claimed in claim 6 and in which the product is provided with an on/off power switch connected such that the rechargeable battery cell is always preliminarily connected to the product irrespective of its voltage value above the lower threshold voltage when the power switch is turned on, except in the event its voltage value is below said lower threshold voltage.

8. A multiple power source for battery operated electrical and electronic products having, in combination, photovoltaic cell means, rechargeable battery cell means and a back-up D.C. voltage source; charging circuit means for connecting the photovoltaic cell means to charge the rechargeable battery cell means in response to light received by the photovoltaic cell means; a pair of oppositely alternatively operative switching means for connecting the rechargeable battery cell means to the product while disconnecting the backup voltage source from the product; and sense and control means connected to monitor the state of voltage charge on the rechargeable battery cell means and for establishing predetermined upper and lower threshold voltage therefor, and for controlling the switching means automatically and instantaneously to connect the backup voltage source to the product while disconnecting the rechargeable battery cell means therefrom when the voltages thereof drops to said lower threshold voltage, and means for automatically and instantaneously reconnecting the rechargeable battery cell means to the product while disconnecting the backup voltage source from the product when the voltage of the rechargeable battery cell means again reaches said upper threshold voltage, whereby in the absence of the backup D.C. voltage source the switching means is powered from the primary D.C. voltage source.

9. A multiple power source as claimed in claim 8 and in which the backup D.C. voltage source comprises battery means that do not recharge in the circuit.

10. A multiple power source as claimed in claim 8 and in which the product is provided with an on/off power switch connected with means for preliminarily connecting the rechargeable battery cell means to the product irrespective of its voltage value above the lower threshold voltage when the power switch is turned on, except in the event its voltage value is below said lower threshold voltage.

11. A multiple power source as claimed in claim 10 and in which said means connecting the rechargeable battery cell means to the product when the said power switch is turned on comprises capacitive and resistive attenuator dividers, the resistive divider establishing the upper threshold voltage and monitoring the voltage of the rechargeable battery cell means, and the capacitive divider providing a switching transient upon turn-on of said power switch to ensure the switching of the rechargeable battery cell means to the product.

12. A multiple power source as claimed in claim 9 and in which said pair of switching means comprises PNP bipolar transistor switches and said sense and control means comprises low-power circuitry for alternately oppositely operating the PNP bipolar transistor switches.

13. A multiple D.C. power source for electrical and electronic products having, in combination, a primary D.C. voltage source provided with rechargeable battery cell means having charging means and connected with voltage-supplying means, for controlling the voltage value of the rechargeable battery cell means; a backup D.C. voltage source; oppositely alternately operative switching means for connecting the primary D.C. voltage source to the product while disconnecting the backup D.C. voltage source from the product; and sense and control means connected to monitor the state of the said voltage value of the primary D.C. voltage source rechargeable battery means and for establishing predetermined upper and lower threshold voltages therefor, and for controlling the switching means in response to the monitoring, automatically and instantaneously to connect the backup D.C. voltage source to the product while disconnecting the primary D.C. voltage source rechargeable battery cell means therefrom when said voltage value thereof drops to said lower threshold voltage; and means for automatically and instantaneously reconnecting the primary D.C. voltage source rechargeable battery cell means to the product while disconnecting the back-up D.C. voltage source from the product when the voltage value of the primary D.C. voltage source rechargeable battery cell means reaches said upper threshold value, whereby in the absence of the backup D.C. voltage source the switching means is powered from the primary D.C. voltage source.

14. A multiple D.C. power source as claimed in claim 13 and in which said voltage-supplying means for said primary D.C. voltage source comprises photovoltaic cell means.

15. A multiple D.C. power source as claimed in claim 13 and in which voltage-supply means for said primary d.c. voltage source comprises an external D.C. power source.

* * * * *